US008217985B2

(12) United States Patent
Stoen et al.

(10) Patent No.: US 8,217,985 B2
(45) Date of Patent: Jul. 10, 2012

(54) METHOD AND APPARATUS FOR A RECIPIENT TO ADJUST A VIDEO STREAM

(75) Inventors: Jeffrey Donald Stoen, Palo Alto, CA (US); Min Qin Huang, Singapore (SG); Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 1069 days.

(21) Appl. No.: 12/135,057

(22) Filed: Jun. 6, 2008

(65) Prior Publication Data

US 2009/0303311 A1 Dec. 10, 2009

(51) Int. Cl.
*H04N 7/14* (2006.01)

(52) U.S. Cl. .................... 348/14.08; 348/14.09

(58) Field of Classification Search .... 348/14.01–14.16, 348/25
See application file for complete search history.

(56) References Cited

U.S. PATENT DOCUMENTS

| 5,305,100 A | 4/1994 | Choi |
| 8,063,929 B2 * | 11/2011 | Kurtz et al. ............... 348/14.08 |
| 2003/0208543 A1 | 11/2003 | Enete et al. |
| 2007/0183741 A1 | 8/2007 | Lerman et al. |
| 2008/0016532 A1 | 1/2008 | Wang et al. |

FOREIGN PATENT DOCUMENTS

WO 0150287 A1 7/2001

OTHER PUBLICATIONS

D. Brown et al., "Adobe—Web Design and Publishing Unleashed" 2000 Edition Chapter 29—"Creating with Premiere."

* cited by examiner

*Primary Examiner* — Suhan Ni
(74) *Attorney, Agent, or Firm* — Creative Technology Ltd (57) ABSTRACT

There is provided a method and apparatus for adjusting at least one parameter of a video stream being received on a recipient screen, the video stream being captured by a sender's video capturing apparatus. The method includes providing a control device to a recipient to adjust the at least one parameter of the video stream captured by the sender's video capturing apparatus; interfacing the control device with a secondary application; the recipient using the control device for adjustment of the at least one parameter of the video stream captured by the sender's video capturing apparatus; and the recipient receiving and viewing the video stream on the recipient screen. There is also provided a control device for adjusting at least one parameter of a video stream being received on a recipient screen, the video stream being captured by a sender's video capturing apparatus.

22 Claims, 6 Drawing Sheets

METHOD AND APPARATUS FOR A RECIPIENT TO ADJUST A VIDEO STREAM

FIELD OF INVENTION

The present invention relates to the field of video communications, particularly in relation to a method and apparatus which enhances video communications.

BACKGROUND

The myriad of webcam applications available has caused demand for webcams to increase to an extent where it is becoming an essential accessory for any computer. This is evident in the trend of webcams being integrated into an increasing number of notebook computers. At this juncture, webcams are typically used in applications like, for example, video chat, video conferencing, games and remote monitoring applications.

These applications allow users to remain connected with any location in the world with an internet connection using video communications, which is typically viewed as an improvement compared to traditional voice-based communications. However, it is generally believed that the quality of the video in video communications needs to be improved to enhance the communications process. One reason why the quality of the video is not desirable relates to the fact that a recipient of the video is currently only able to adjust typical settings on a recipient display device when adjusting how the received video is viewed. By doing this, while the received video may appear to be more palatable to the recipient, the recipient will need to re-adjust the settings on the recipient display to an original set of settings each and every instance when video is received from a sender. This is tedious and inconvenient to the recipient.

This problem of re-adjusting the settings on the recipient display is further exacerbated in an instance when there are more than two parties in a communications session. In such an instance, it is highly unlikely that re-adjusting the settings on the recipient display will enable the recipient to view every party in the communications session in a desirable manner.

While it may be possible for the recipient to instruct each party to adjust their appearance with regard to a preference of the recipient, it is a rather troublesome process (eg. adjusting light conditions, adjusting face position of other party, adjusting position in relation to camera, and so forth).

It would be most desirable if the recipient could vary the quality of each received video without tampering with the settings on the recipient display as this would eliminate a tedious and inconvenient process for the recipient.

SUMMARY

In a first aspect, there is provided a method for adjusting at least one parameter of a video stream being received on a recipient screen, the video stream being captured by a sender's video capturing apparatus. The method includes providing a control device to a recipient to adjust the at least one parameter of the video stream captured by the sender's video capturing apparatus; interfacing the control device with a secondary application; the recipient using the control device for adjustment of the at least one parameter of the video stream captured by the sender's video capturing apparatus; and the recipient receiving and viewing the video stream on the recipient screen. It is advantageous that the video stream viewed on the recipient screen is adjustable as per a preference of the recipient, with all settings of the recipient screen being unchanged after adjustment of the video stream by the recipient. The video stream may be generated during, for instance, an instant messaging (IM) session, a video conferencing session or a video recording session.

The control device may be either a user interface which resides on a computer controlling the recipient screen or may be a separate device which is able to interface with the computer controlling the recipient screen. Preferably, the recipient screen may be a display such as, for example, a CRT monitor, an LCD monitor, a plasma screen, and an image projector. The secondary application may be an instant messaging (IM) application, a video conferencing application, or a video playback application. It is advantageous that the control device is able to control more than one video capturing apparatus, including the recipient's video capturing apparatus.

It is preferable that the at least one parameter includes both image and audio settings. The image settings may be selected from, for example, video effects, video aspect ratio, video image size, brightness, contrast, sharpness, colour, exposure, gamma, white balance, back light compensation, digital zoom, digital pan, digital zoom and so forth. The audio settings may be selected from, for example, bass, treble, balance, volume, audio enhancement effects, noise cancellation effect and the like. The adjustment of the at least one parameter of the video stream is done at either a server prior to receipt at the recipient screen or at the sender's video capturing apparatus. The video capturing apparatus may be either a webcam, or a digital camera.

Advantageously, freeing up bandwidth during instances of high packet loss may be done by, for example, muting audio in the video stream, reducing a video image size, or removing image frames in the video stream. It is also advantageous that adjusting the video aspect ratio allows for the video stream to be displayed at an aspect ratio in accordance with a configuration of the recipient screen.

In another aspect, there is provided a control device for adjusting at least one parameter of a video stream being received on a recipient screen, the video stream being captured by a sender's video capturing apparatus. The control device may preferably be able to adjust at least one parameter of the video stream at either a server prior to receipt at the recipient screen or at the sender's video capturing apparatus. The video stream may be generated during for example, an instant messaging (IM) session, a video conferencing session or a video recording session. The recipient screen may be a display such as, for example, a CRT monitor, an LCD monitor, a plasma screen, an image projector and so forth.

Advantageously, the control device is able to control more than one video capturing apparatus, including the recipient's video capturing apparatus. The video capturing apparatus may be either a webcam, or a digital camera. The control device may transmit instructions using either a wired connection or a wireless connection to the computer controlling the recipient display.

It is preferable that the at least one parameter includes both image and audio settings. The image settings may be selected from, for example, video effects, video aspect ratio, video image size, brightness, contrast, sharpness, colour, exposure, gamma, white balance, back light compensation, digital zoom, digital pan, or digital zoom. Similarly, the audio settings may be selected from, for example, bass, treble, balance, volume, audio enhancement effects, or noise cancellation effect.

DESCRIPTION OF DRAWINGS

In order that the present invention may be fully understood and readily put into practical effect, there shall now be

DESCRIPTION OF PREFERRED EMBODIMENTS

Figure 1:
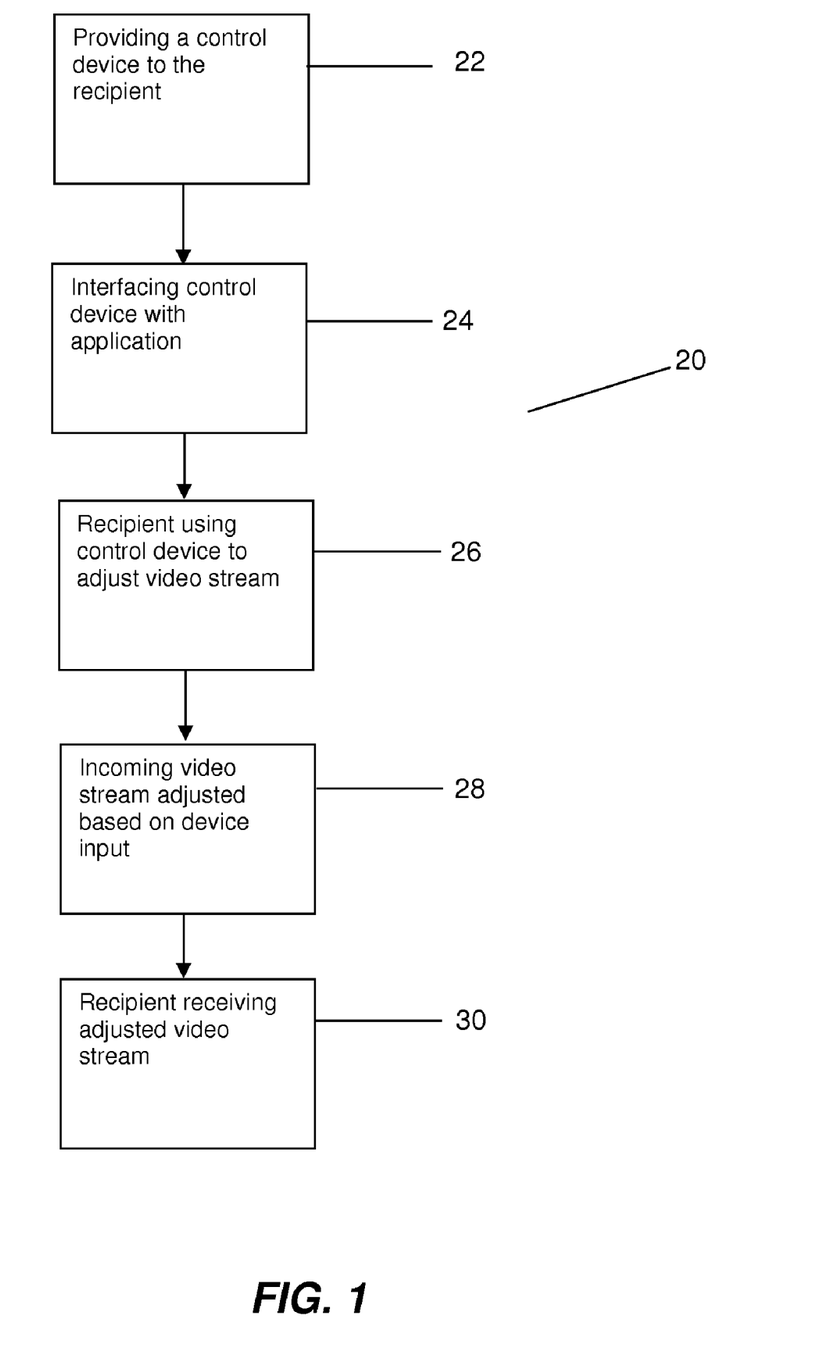
FIG. 1 shows a process flow of the method of the present invention.

Referring to FIG. 1, there is provided a method 20 for adjusting at least one parameter of a video stream being received on a recipient screen. The recipient screen may be a display selected from, for example, a CRT monitor, an LCD monitor, a plasma screen, an image projector and so forth. The video stream may be generated during a session such as, for example, an instant messaging (IM) session, a video conferencing session, a video recording session akin to a video blog and so forth.

In the method 20, the video stream may be captured by a sender's video capturing apparatus. The video capturing apparatus may include either a webcam, or a digital camera. The video capturing apparatus should be enabled to stream video to a server on the internet either directly or through a connection apparatus.

The method 20 includes providing a control device to a recipient 22. The control device may be employed to adjust the at least one parameter of the video stream captured by the sender's video capturing apparatus. The at least one parameter may include both image and audio settings. The image settings may include, for example, video effects, video aspect ratio, video image size, brightness, contrast, sharpness, colour, exposure, gamma, white balance, back light compensation, digital zoom, digital pan, and digital tilt. Similarly, the audio settings may include, for example, bass, treble, balance, volume, audio enhancement effects, and noise cancellation effect. It should be noted that the video effects include, for example, accessories addition effects, background selection, image filtering effects, and so forth. Many examples of video effects may be found at www.mylivecam.com, an informative portal on web cams operated by Creative Technology Ltd.

It should be noted that during instances of high packet loss, audio in the video stream may be muted by the recipient to free up bandwidth. During such instances, it should be noted that more video images are received on the recipient screen as muting the audio in the video stream allows for a higher rate of frame transmission for the video stream. Alternatively, reducing the video image size may also aid in freeing up bandwidth. In yet another alternative, image frames in the video stream may be removed by the recipient to free up bandwidth. These options cause the video stream to appear less jerky and less block-ish to the recipient.

There may also be instances where the video stream is transmitted at an aspect ratio which is not suitable to the aspect ratio of the recipient screen. This is likely as an increasing number of recipient screens are having a 16:9 wide screen ratio, compared to a 4:3 screen ratio configuration found in most CRT monitors. Both video bandwidth and the video image size may be adjusted to enable the video stream to be displayed at an appropriate aspect ratio in accordance with a configuration of the recipient screen. It should be noted that the configuration may relate to both physical configuration and settings of the recipient screen. Being able to adjust the aspect ratio allows the video stream to be displayed in an optimal manner such that all video images may be viewed in the appropriate aspect ratio.

Figure 2:
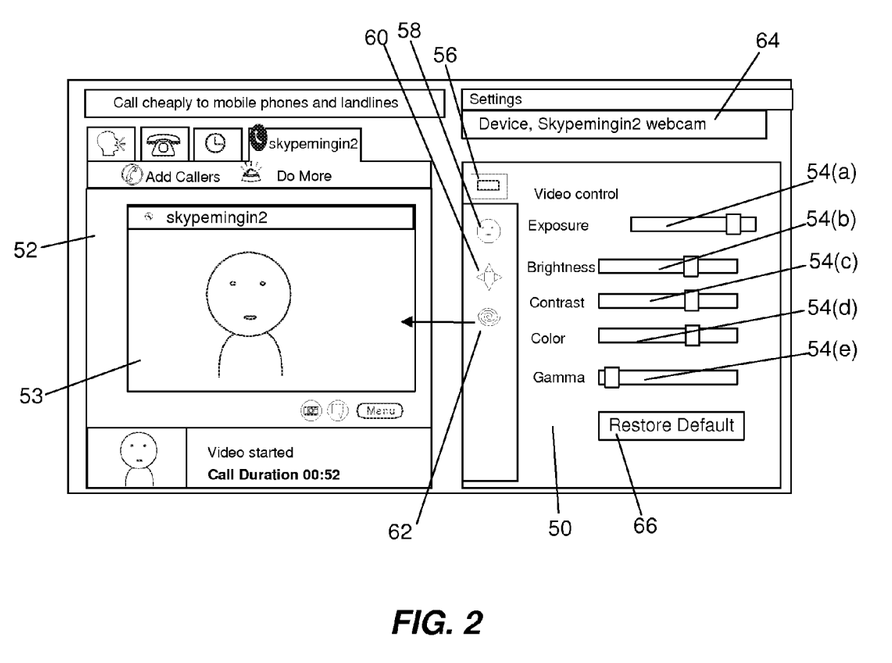
FIG. 2 shows a first representation of a control device used in the method.

The control device provided to the recipient should be interfaced with a secondary application 24 before the control device can be used by the recipient. The secondary application may include, for example, an instant messaging (IM) application, a video conferencing application and a video playback application. The control device may be either a user interface which resides on a computer controlling the recipient screen, or a separate device like a remote control which is able to interface with the computer controlling the recipient screen. The control device may be an application which overlays the secondary application in an unobtrusive manner. An example of the control device as a user interface residing on a computer controlling the recipient screen is shown in FIG. 2. The recipient may use the control device for adjustment of the at least one parameter of the video stream captured by the sender's image capturing apparatus 26.

Referring to FIG. 2, there is shown a user interface 50. In this non-limiting example, the user interface 50 is shown interfacing with an IM application 52 in an unobtrusive manner. The IM application 52 has a video window 53. It should be noted that the video window 53 may be enlarged such that a larger area of the recipient screen is utilized for the video window 53. It can be seen that the user interface 50 includes an image settings tab 56. When the image settings tab 56 is selected (as shown), there is shown adjustment bars 54(a), 54(b), 54(c), 54(d), 54(e) for the adjustment of image settings exposure, brightness, contrast, colour, gamma respectively. There is also shown a effects settings tab 58 for adding effects to the video stream, a pan-and-tilt tab 60 for adjusting the source video viewing area, and an audio settings tab 62 for adjusting audio parameters of the video stream. Of course, the number of tabs should not be restricted to the aforementioned tabs. Each tab may also include a restore default button 66 such that the video stream reverts to an original set of settings prior to adjustment by the recipient using the user interface 50.

Figure 3:
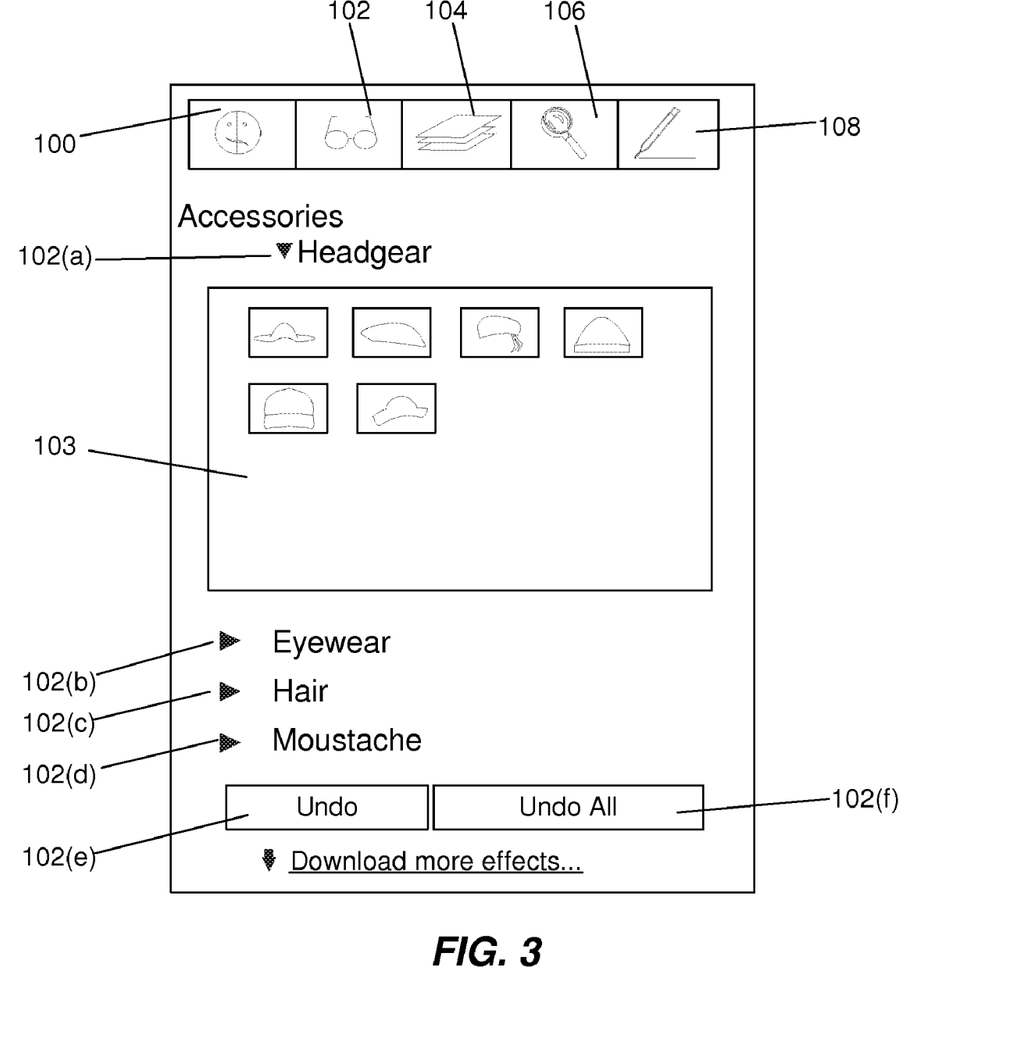
FIG. 3 shows a first sub-tab of an effects tab 58 of FIG. 2.
Figure 4:
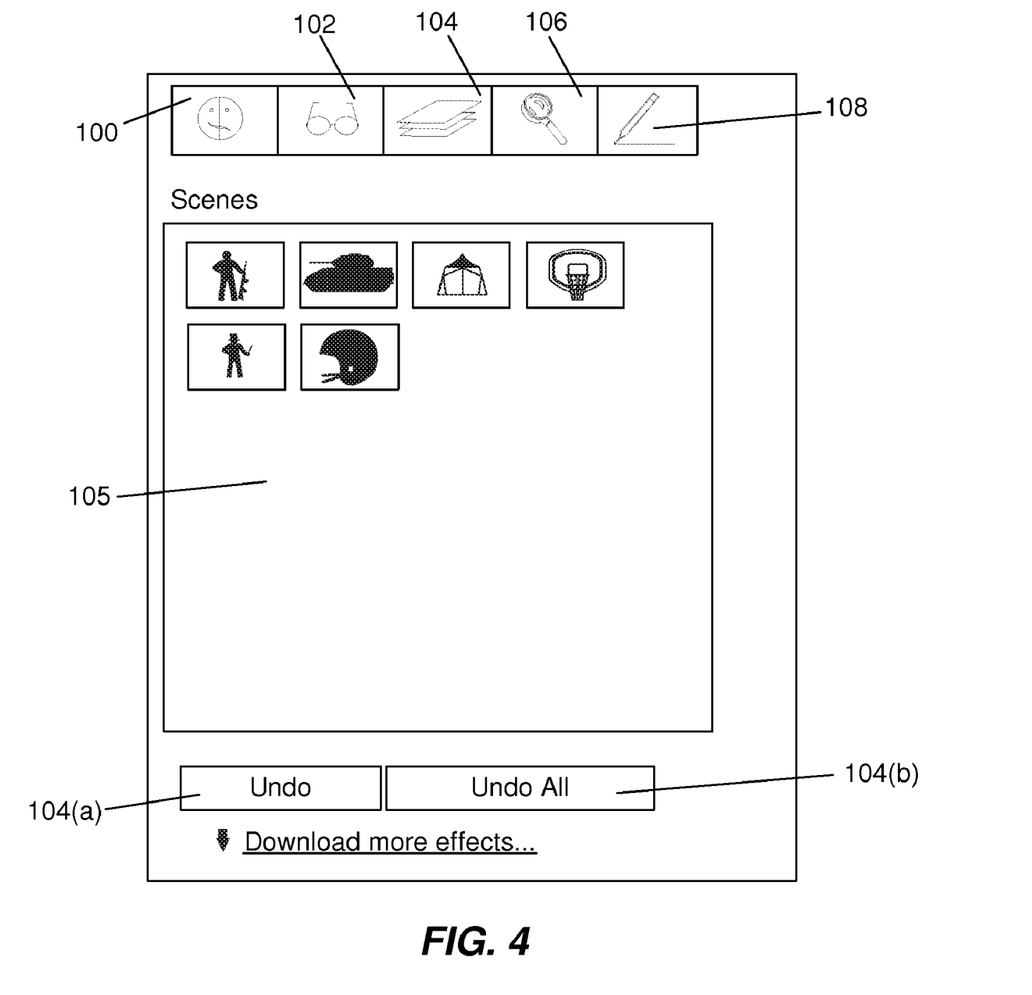
FIG. 4 shows a second sub-tab of the effects tab 58 of FIG. 2.
Figure 5:
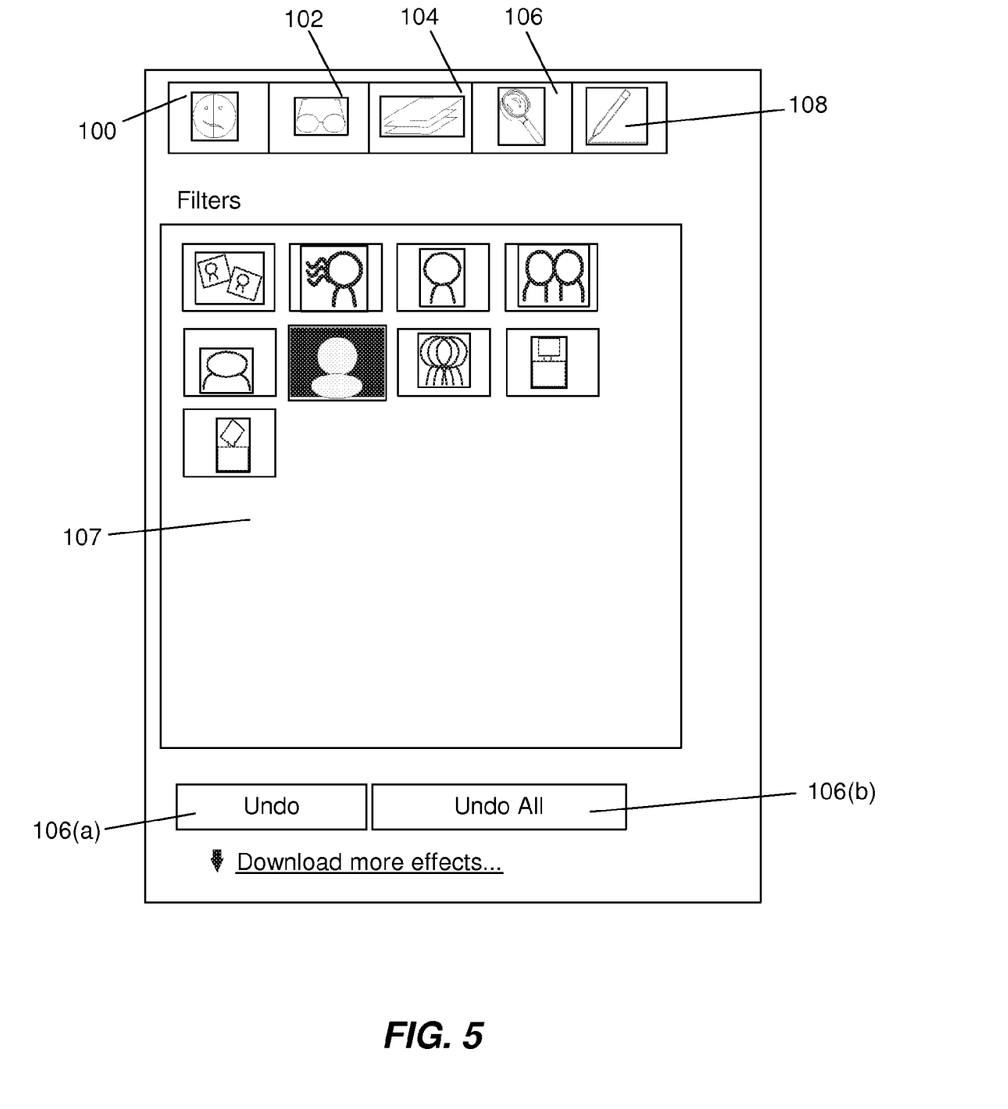
FIG. 5 shows a third sub-tab of the effects tab 58 of FIG. 2.

When the effects settings tab 58 is selected, sub-tabs like those shown in FIGS. 3-5 may be selectable by the recipient. Referring to FIG. 3, there is shown accessories sub-tab 102 for addition of accessories effects. Accessories selected by the recipient may be positioned and overlaid on any portion of the incoming video stream. The accessories may include, for example, headgear choices 102(a), eyewear choices 102(b), hairstyles 102(c), moustache styles 102(d) and so forth. The recipient is able to remove an accessories effect by using the "undo" button 102(e) after selecting the unwanted accessory effect and also can remove all accessories effects used in combination by using the "undo all" button 102(f). For illustrative purposes, a selection of headgear choices is shown in headgear window 103.

Referring to FIG. 4, there is shown background sub-tab 104 for selection of backgrounds. For illustrative purposes, a selection of background choices is shown in scene window 105. A background selected by the recipient may be incorporated as the backdrop of the incoming video stream. It should be noted that the background may be either a photographic image or an artistic image. The recipient is able to remove a background by using the "undo" button 104(a) after selecting the unwanted background and also can remove all backgrounds used in combination by using the "undo all" button 104(b).

Referring to FIG. 5, there is shown filter sub-tab 106 for selection of visual filters. For illustrative purposes, a selection of filter choices is shown in filter window 107. A filter selected by the recipient may be incorporated into the incoming video stream. The selection of a filter by the recipient may vary a manner which a sender appears to the recipient. For example, the filter may cause the sender to appear as if the sender is on fire, the filter may cause the sender to appear as if the sender is a stunted midget, and so forth. The recipient is able to remove a filter by using the "undo" button 106(a) after selecting the unwanted filter and also can remove all filters used in combination by using the "undo all" button 106(b).

Also shown in FIGS. 3-5 are a face expression sub-tab 100, and a doodling sub-tab 108. Examples of the face expression sub-tab 100 and the doodling sub-tab 108 are not provided as they are merely further examples. For the purpose of completeness, the face expression sub-tab 100 is used by the recipient to vary a facial expression of the sender, while the doodling sub-tab 108 is used by the recipient to incorporate doodles of any form into the incoming video stream.

The user interface 50 may also include a device selector 64 as the user interface 50 may be able to control more than one video capturing apparatus, including the recipient's own video capturing apparatus. This enables video streams from multiple parties to be adjusted by the recipient using a single user interface 50 (control device). The adjustment of the at least one parameter of the incoming video stream 28 is done either at a server prior to receipt at the recipient screen or at a sender's video capturing apparatus. In this regard, the adjustments made to the video stream by the recipient may not be visible to the sender, unless the sender also has access to the recipient's view. Typically, the sender should only be concerned with content of the video stream and need not be concerned with how the video stream is received by the recipient since the recipient is able to define how the video stream is received at the recipient screen. Finally, the recipient receives and views the video stream on the recipient screen 30.

It should be noted that adjustment of the video stream as per a preference of the recipient only changes a manner the video stream appears and sounds to the recipient, and all settings of the recipient screen are unchanged despite adjustment of the video stream by the recipient.

In a second aspect, there is provided a control device for adjusting at least one parameter of a video stream being received on a recipient screen, the video stream being captured by a sender's video capturing apparatus. The recipient screen may be a display like, for example, a CRT monitor, an LCD monitor, a plasma screen, an image projector and so forth.

Figure 6:
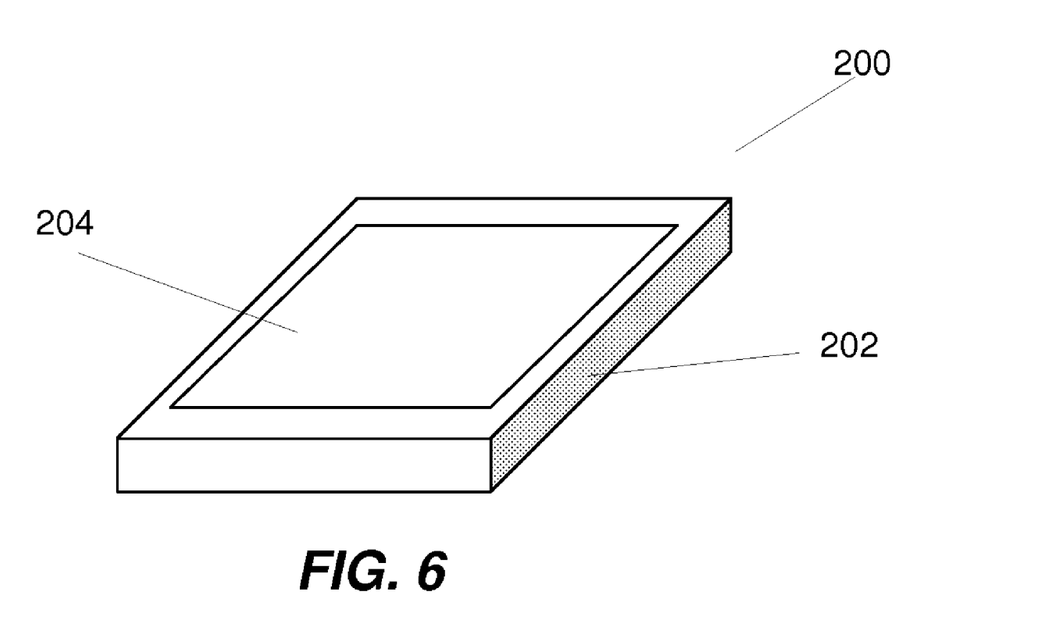
FIG. 6 shows a second representation of the control device used in the method.

One representation of the control device may be the user interface 50 in FIG. 2, while another representation of the control device may be seen in a remote control 200 of FIG. 6. The type and form of the control device is not limited to the aforementioned user interface 50 and remote control 200, and may take on any other type and form. In the subsequent sessions, the control device will be described with respect to remote control 200 as user interface 50 has already been described in an earlier section.

The remote control 200 may be able to adjust at least one parameter of the video stream at the recipient screen. The video stream may be generated during a session like, for example, an instant messaging (IM) session, a video conferencing session, a video recording session and so forth. The adjustment of the at least one parameter of the video stream may be at either a server prior to receipt at the recipient screen or at the sender's video capturing apparatus. In this regard, the adjustments made to the video stream by the recipient using the remote control 200 may not be visible to the sender, unless the sender also has access to the recipient's view. Typically, the sender should only be concerned with content of the video stream and need not be concerned with how the video stream is received by the recipient since the recipient is able to define how the video stream is received at the recipient screen. The video capturing apparatus may be either a webcam, or a digital camera.

The remote control 200 may include a case 202 to contain all components of the remote control 200. The case 202 may include a touch sensitive panel 204 which also acts as a display, and the remote control 200 may transmit instructions through either a wired connection or a wireless connection to the computer controlling the recipient display. The instructions to either the server or the sender's video capturing apparatus are then subsequently transmitted from the computer controlling the recipient display.

The remote control 200 may include a user interface similar to the user interface 50 described earlier. The user interface on the remote control 200 may include a device selector 64 like that of the user interface 50 so as to control more than one video capturing apparatus, including the recipient's own video capturing apparatus. This enables video streams from multiple parties to be adjusted by the recipient using the remote control 200. The touch sensitive panel 204 of the remote control 200 may also display the tabs and sub-tabs as shown in FIGS. 3-5 as described earlier.

The at least one parameter may include both image and audio settings. The image settings may include, for example, video effects, video aspect ratio, video image size, brightness, contrast, sharpness, colour, exposure, gamma, white balance, back light compensation, digital zoom, digital pan, and digital tilt. Similarly, the audio settings may include, for example, bass, treble, balance, volume, audio enhancement effects, and noise cancellation effect. It should be noted that the video effects include, for example, accessories addition effects, background selection, image filtering effects, and so forth. Many examples of video effects may be found at www-.mylivecam.com, an informative portal on web cams operated by Creative Technology Ltd.

Whilst there has been described in the foregoing description preferred embodiments of the present invention, it will be understood by those skilled in the technology concerned that many variations or modifications in details of design or construction may be made without departing from the present invention.

The invention claimed is:

1. A method for adjusting at least one parameter of a video stream being received on a recipient screen, the video stream being captured by a sender's video capturing apparatus, the method including:
   providing a control device to a recipient to adjust the at least one parameter of the video stream captured by the sender's video capturing apparatus;
   interfacing the control device with a secondary application;
   the recipient using the control device for adjustment of the at least one parameter of the video stream captured by the sender's video capturing apparatus; and
   the recipient receiving and viewing the video stream on the recipient screen,
   wherein the video stream viewed on the recipient screen is adjustable as per a preference of the recipient, with all settings of the recipient screen being unchanged after adjustment of the video stream by the recipient.

2. The method of claim 1, wherein the at least one parameter includes both image and audio settings.

3. The method of claim 2, wherein the image settings are selected from a group consisting of: video effects, video aspect ratio, video image size, brightness, contrast, sharpness, colour, exposure, gamma, white balance, back light compensation, digital zoom, digital pan, and digital zoom.

4. The method of claim 2, wherein the audio settings are selected from a group consisting of: bass, treble, balance, volume, audio enhancement effects, and noise cancellation effect.

5. The method of claim 1 further comprising freeing up bandwidth during instances of high packet loss, wherein freeing up bandwith is done using a choice selected from the group consisting of: muting audio in the video stream, reducing a video image size, and removing image frames in the video stream.

6. The method of claim 1, wherein the control device is either a user interface which resides on a computer controlling the recipient screen or is a separate device which is able to interface with the computer controlling the recipient screen.

7. The method of claim 3, wherein adjusting the video aspect ratio allows for the video stream to be displayed at an aspect ratio in accordance with a configuration of the recipient screen.

8. The method of claim 1, wherein the adjustment of the at least one parameter of the video stream is done at either a server prior to receipt at the recipient screen or at the sender's video capturing apparatus.

9. The method of claim 1, wherein the recipient screen is a display selected from a group consisting of: a CRT monitor, an LCD monitor, a plasma screen, and an image projector.

10. The method of claim 1, wherein the video stream is generated during a session selected from a group consisting of: an instant messaging (IM) session, a video conferencing session and a video recording session.

11. The method of claim 10, wherein the secondary application is selected from a group consisting of: an instant messaging (IM) application, a video conferencing application and a video playback application.

12. The method of claim 1, wherein the video capturing apparatus is selected from either a webcam, or a digital camera.

13. The method of claim 1, wherein the control device is able to control more than one video capturing apparatus, including the recipient's video capturing apparatus.

14. A control device for adjusting at least one parameter of a video stream being received on a recipient screen, the video stream being captured by a sender's video capturing apparatus, the control device being able to adjust at least one parameter of the video stream at either a server prior to receipt at the recipient screen or at the sender's video capturing apparatus.

15. The control device of claim 14, wherein the control device is able to control more than one video capturing apparatus, including the recipient's video capturing apparatus.

16. The control device of claim 14, wherein the video capturing apparatus is selected from either a webcam, or a digital camera.

17. The control device of claim 14, wherein the video stream is generated during a session selected from a group consisting of: an instant messaging (IM) session, a video conferencing session and a video recording session.

18. The control device of claim 14, wherein the recipient screen is a display selected from a group consisting of: a CRT monitor, an LCD monitor, a plasma screen, and an image projector.

19. The control device of claim 14, wherein the at least one parameter includes both image and audio settings.

20. The control device of claim 19, wherein the image settings are selected from a group consisting of: video effects, video aspect ratio, video image size, brightness, contrast, sharpness, colour, exposure, gamma, white balance, back light compensation, digital zoom, digital pan, and digital zoom.

21. The control device of claim 19, wherein the audio settings are selected from a group consisting of: bass, treble, balance, volume, audio enhancement effects, and noise cancellation effect.

22. The control device of claim 14, wherein the control device transmits instructions using either a wired connection or a wireless connection to the computer controlling the recipient display.

* * * * *